United States Patent [19]

Leunig et al.

[11] Patent Number: 4,515,848
[45] Date of Patent: May 7, 1985

[54] MATERIALS AND METHODS FOR MAKING RESIN-RIGIDIFIED ARTICLES

[75] Inventors: Carl V. Leunig, Glenmont, N.Y.; Robert F. Kovar, Wrentham, Mass.

[73] Assignee: Gates Formed Fibre Products Inc., Auburn, Me.

[21] Appl. No.: 535,320

[22] Filed: Sep. 23, 1983

[51] Int. Cl.³ ............................................... B32B 3/00
[52] U.S. Cl. .................................... 428/172; 264/324; 264/524; 264/DIG. 48; 427/386; 427/389.9; 428/288; 428/290
[58] Field of Search ....................... 428/288, 290, 172; 427/386, 389.9; 264/500, 546, 324, DIG. 48

[56] References Cited

U.S. PATENT DOCUMENTS

| 2,576,864 | 11/1951 | Valente . | |
|---|---|---|---|
| 2,607,494 | 8/1952 | Valente et al. . | |
| 3,256,372 | 6/1946 | Adams et al. . | |
| 3,390,429 | 7/1968 | Palmai . | |
| 3,463,689 | 8/1969 | Palmai . | |
| 3,573,158 | 3/1971 | Pall et al. . | |
| 4,311,753 | 1/1982 | Pucci | 428/290 |
| 4,397,910 | 8/1983 | Benson | 428/290 |

Primary Examiner—Marion E. McCamish
Attorney, Agent, or Firm—C. H. Castleman, Jr.; H. W. Oberg, Jr.

[57] ABSTRACT

The subject invention relates to methods and materials for making porous resin rigidified shaped articles suitable for filters, surgical trays, and the like, which comprises the steps of impregnating a non-woven fabric with a predetermined amount of thermoplastic or thermosetting water-based epoxy resin; partially curing the resin-impregnated fabric; and, thereafter molding the partially cured fabric into a desired shape with sufficient heat to advance the curing of the resin.

18 Claims, 2 Drawing Figures

MATERIALS AND METHODS FOR MAKING RESIN-RIGIDIFIED ARTICLES

BACKGROUND OF THE INVENTION

1. Field of the Invention

This invention relates to methods and materials for making porous resin-rigidified shaped articles from non-woven fabrics including filters, surgical trays, and the like.

2. Brief Description of the Prior Art

Various methods for making resin rigidified shaped articles are well known. Typical processes of this type involve precutting a piece of fabric and mounting it in a suitable pin frame; heat softening the fabric and molding it into the desired shape, coating the shaped article with a thermosetting or thermoplastic resin; and curing the resin to increase the rigidity of the shaped article.

For example, U.S. Pat. No. 2,576,864 discloses a method for manufacturing self-supporting mechanically strong filter elements which involves molding a thermosetting or thermoplastic resin-impregnated sheets of cellulosic multi-ply pad or batting, into a desired shape with heat and pressure causing the resin to cure. The cured resin rigidifies the filter element, that is, makes it a mechanically strong self-supporting structure. The word rigidified and related terms as used herein are intended to mean sufficiently stiffened to retain a desired (molded) shape without significant deformation under ordinary conditions of use. Similar processes are disclosed in U.S. Pat. Nos. 2,607,494; 3,972,694; and 3,256,372. U.S. Pat. Nos. 3,390,429 and No. 3,463,689 teach similar hollow cylindrical filter forming methods that include impregnating non-woven fibrous material with thermosetting resin; drying the resin at temperatures below the curve point; forming the filter on a rotating arbour and curing the resin.

The above described processes often involve the use of materials that produce noxious fumes during the curing steps, e.g. melamine/formaldehyde resins. Another disadvantage of the prior art processes is that they call for uninterrupted processing of the resin-impregnated shaped material until completion of the curing step to avoid undesirable deformations due to physical stresses on the article before it is sufficiently rigidified by curing. Performing all these steps in a single operation is often labor intensive and slow. Moreover, these processes must be capable of producing complex molded shapes, of suitable colors, at reasonable costs.

In some applications the resin rigidified shaped articles will require special properties, for example, in one contemplated application, as the shaped article is an enclosure for surgical devices that may be treated by sterilization techniques such as autoclaving or the like, such enclosures must permit the free flow of steam therethrough to effectuate sterilization of the enclosed device while retaining its rigidity. In another application, preparing self-supporting or shape retaining filter elements the resin rigidified materials may be required to have uniform thickness, density or porosity over at least a portion of the element's body.

SUMMARY OF THE INVENTION

The method of the present invention comprises the steps of impregnating a non-woven fabric such as spun-bonded polyester with selected amounts of one or more water-based epoxy resins and partially curing, preferably B-staging, the resin to render the impregnated sheet suitable for handling. Thereafter the partially cured resin-impregnated fabric may be molded into a desired shape at sufficient temperatures to further cure the resin preferably to the C-stage. If desired, the partially cured resin-impregnated non-woven fabric may be conveniently stored in rolls or sheets for molding at some time in the future. The partially cured resin-impregnated material comprises a non-woven fabric such as spun-bonded polyester coated with a partially cured water-based epoxy resin. The quantity of resin impregnant is selected so that the fully cured molded product has a desired porosity.

The fully cured molded articles comprise a non-woven fabric impregnated with fully cured water-based epoxy resin molded into a desired shape.

DETAILED DESCRIPTION OF THE INVENTION

The term non-woven fabric as used herein means any mass of entangled filaments including sheets of non-parallel continuous synthetic organic filaments randomly distributed throughout said sheet, and so disposed as to be substantially separated and independent of each other except at filament cross-over points within the sheet and preferably being bonded at a plurality of such points. The preferred synthetic organic filaments are polyesters including poly(ethylene terepthalate) and like materials. Several such fabrics are fully described in U.S. Pat. Nos. 2,576,867 and 2,689,199 the texts of which are incorporated herein by reference.

The terms thermosetting or thermoplastic water-based epoxy resin, as used herein, include Novalac, Bis-Phenol A and Aliphatic epoxy resins. These resins are well described in the literature, e.g. see Kirk-Othmer, Encyclopedia of Chemical Technology 2d ed., Interscience 1968, and may be prepared by conventional polymerization techniques and are readily available from various commercial sources, such as Polyset Chemical Co. of Malta, N.Y. 12151. A preferred resin is Novalac epoxy resin having a functionality greater than five, known as a Polyset PC-2932. It will be appreciated that various combinations of compatible thermosetting and thermoplastic water-based epoxy resins may be equivalent to a single polymer for many applications.

Figure 1:
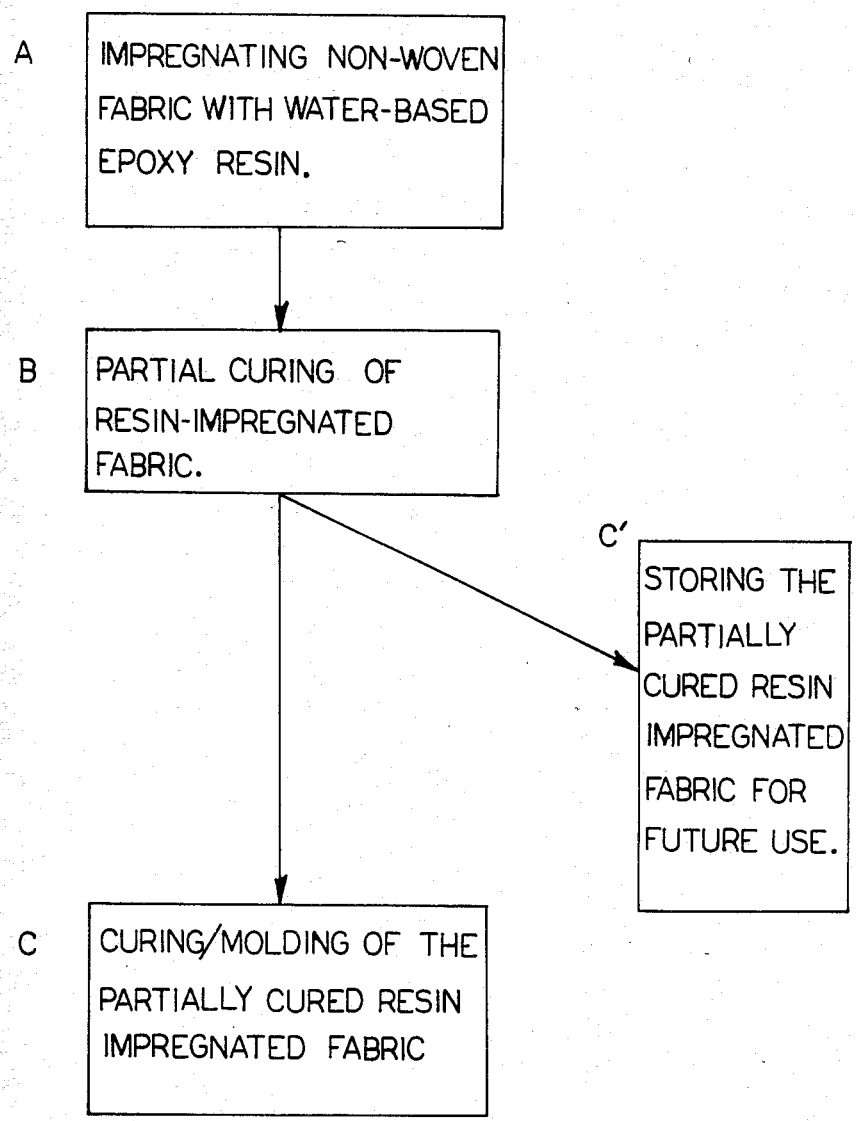
FIG. 1 is a flow chart outlining the method of the present invention.

Referring to FIG. 1, Block A represents the first step of the present invention which involves coating or impregnating a non-woven fabric with a predetermined amount of thermosetting or thermoplastic water-based epoxy resin calculated to give a finished product of the desired porosity upon final curing while imparting sufficient rigidity to the partially cured resin-impregnated fabric. The required quantity of resin may be determined empirically. Preferably, the non-woven fabric may be continuously fed from a large roll, or the like, to the impregnating means wherein it may be sprayed with or dipped in the uncured resin.

In the next step represented by Block B in FIG. 1 the impregnated or coated sheet is partially cured. This is sometimes referred to as B-staging. Partial curing may be effected by raising the temperature of the resin to a specific range usually for a specific period of time depending upon the particular resin or resin combination being cured.

The next step in the process is represented alternatively in Blocks C or C', FIG. 1, since the partially cured resin-impregnated non-woven fabric may be stored in rolls or sheets and used for molding shaped articles at some future time or more preferably, it may be fed or indexed into a heated molding means wherein it acquires a desired shape and the temperature of the molding means and residence time of the impregnated fabric therein are regulated to advance the curing of the resin. In the case of thermoset resins curing is preferably advanced to the point where the resin becomes substantially infusible, sometimes referred to as the C-stage. The molding means may be a conventional matched-die metal mold maintained at the required temperature in which case the shaping and final curing of the product occur in one step.

The cured shaped article may thereafter be indexed to a cutting station, cooled, and trimmed, as is known in the art, producing a rigid shaped article having a specified porosity. See for example, U.S. Pat. Nos. 2,576,864; 3,463,689; and 3,390,429.

EXAMPLE

Figure 2:
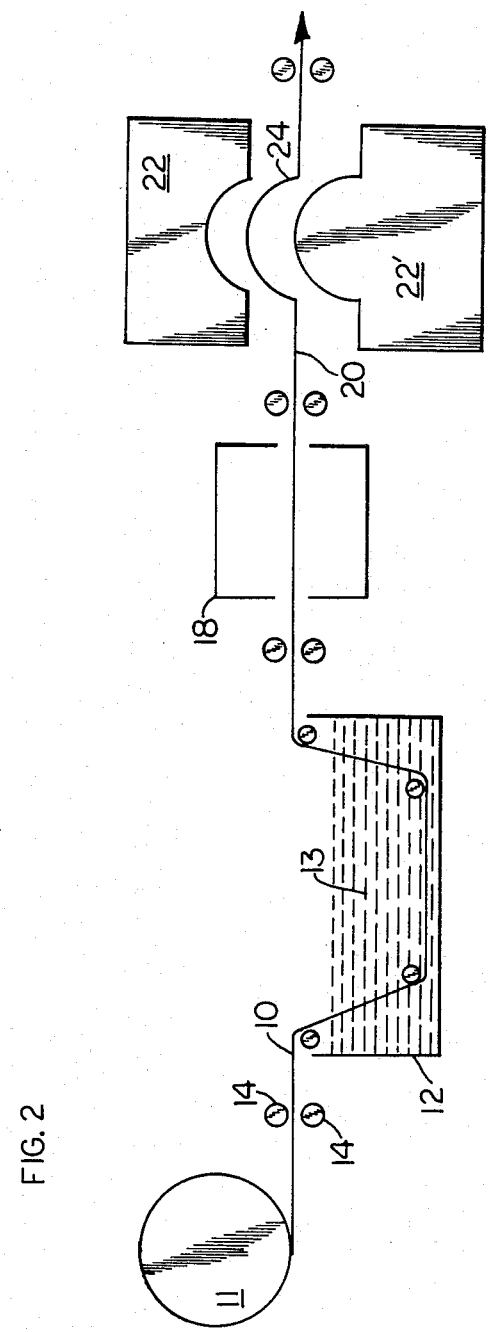
FIG. 2 is a diagrammatic layout illustrating the method for forming resin rigidified molded articles.

In a preferred embodiment of the present invention illustrated in FIG. 2, a spun bonded polyester sheet 10 is continuously fed from roll 11 into impregnator 12 by mechanically driven pinch rollers 14 and 14'. In the impregnator the sheet 10 is continuously pulled through a six inch depth resin bath 13 at a rate of 1 to 100 feet per minute at 70° F. and thereafter fed into a conventional hot air circulating oven 18 that is maintained at about 220° F. The resin-impregnated sheet has a sufficient residence time in oven 18 to dry and partially cure the resin. The partially cured resin-impregnated fabric 20 is thereafter indexed into a preheated matched-die metal mold having two halves 22 and 22'. The temperature of the mold is maintained at about 350° F. The mold is automatically closed for 0.5 to 3 minutes to shape and cure the resin-impregnated fabric therein. Thereafter the mold is opened and the shaped article 24 is removed for cooling, cutting, and trimming into the final resin rigidified shaped article desired.

What is claimed is:

1. A resin rigidified porous and fluid permeable product, which comprises:
a non-woven fabric comprised of synthetic organic filaments entangled together and partially impregnated with a partially cured thermosetting or thermoplastic water-based epoxy resin.

2. The resin regidified product recited in claim 1 wherein:
the non-woven fabric is spun bonded polyester; and
the thermosetting or thermoplastic water-based epoxy resin is selected from the group consisting of Novalac, Bis-Phenol A, and aliphatic epoxy resins.

3. The resin rigidified product recited in claim 1 wherein:
the non-woven fabric is spun bonded polyester; and
the thermosetting or thermoplastic water-based epoxy resin is Novalac epoxy resin.

4. A porous resin-rigidified shaped article permeable to gas, which comprises:
a non-woven fabric comprised of synthetic organic filaments entangled together, partially impregnated with a cured thermoplastic or thermosetting water-based epoxy resin to impart the desired porosity and permeability to the article, and mold formed in a desired shape retaining configuration.

5. The porous resin rigidified shaped article recited in claim 4, wherein:
non-woven fabric is spun bonded polyester; and
the thermosetting or thermoplastic water-based epoxy resin is selected from the group consisting of Novalac, Bis-Phenol A, and aliphatic epoxy resins.

6. The porous resin rigidified shaped article recited in claim 4, wherein:
the non-woven fabric is spun bonded polyester; and
the thermosetting or thermoplastic water-based epoxy resin is Novalac epoxy resin.

7. The porous resin-rigidified article or claim 4 in the form of a surgical tray which, in use is autoclavable allowing steam to permeate freely therethrough.

8. The porous resin-rigidified article of claim 4 in the form of a filter element.

9. A method for making a porous resin-rigidified shaped article permeable to fluids, comprising:
partially impregnating a non-woven fabric comprising synthetic organic entangled filaments with a thermosetting or thermoplastic water-based epoxy resin, the quantity of resin impregnant being selected to give porosity and fluid permeability to the finished shaped article;
heating the impregnated fabric to partially cure the resin;
molding the partially cured resin-impregnated fabric into a desired shaped article at sufficient temperature to advance the curing of the resin and impart shape retention to the article.

10. The method recited in claim 9 wherein the partially cured resin-impregnated fabric is molded in a matched-die mold having male and female portions, at least a portion of such mold portions imparting curvature to the shaped article.

11. The method recited in claim 9 wherein the mold portions are so configured to impart a complex shape to the shaped article.

12. As an article of manufacture, a shaped article made in accordance with the method of claim 9.

13. The article of manufacture of claim 12, in the form of a surgical tray which, in use, is autoclavable allowing steam to permeate freely therethrough.

14. The article of manufacture of claim 12, in the form of a filter element.

15. The method for making a resin-rigidified shaped article recited in claim 9, further comprising the steps of:
indexing a continuous length of the non-woven fabric through the entire process; and
cooling, cutting and trimming the shaped article after completion of the molding step.

16. The method recited in claim 15, wherein:
the non-woven fabric is spun-bonded polyester.

17. The method recited in claim 16 wherein:
the thermosetting or thermoplastic water-based epoxy resin is selected from the group consisting of Novalac, Bis-Phenol A, and aliphatic epoxy resins.

18. The method recited in claim 16 wherein:
the thermosetting or thermoplastic water-based epoxy resin is Novalac epoxy resin.

* * * * *